United States Patent [19]

Ohkawa

[11] 4,014,254
[45] Mar. 29, 1977

[54] DEVICE FOR WRAPPING SHEETS AROUND FOOD IN ROLLED FORM AND OTHER FOOD PROCESSING DEVICES

[75] Inventor: Nobuyoshi Ohkawa, Amagasaki City, Japan

[73] Assignee: Daieigiken, Inc., Amagasaki, Japan

[22] Filed: Mar. 12, 1974

[21] Appl. No.: 450,489

[30] Foreign Application Priority Data

Mar. 12, 1973 Japan .............................. 48-29192
Mar. 12, 1973 Japan .............................. 48-29193
Mar. 12, 1973 Japan .............................. 48-29194

[52] U.S. Cl. ............................................. 99/450.6
[51] Int. Cl.² ....................................... A21C 9/06
[58] Field of Search .......... 99/450.1, 450.6, 450.7; 53/228, 229, 232; 222/217, 275, 255

[56] References Cited

UNITED STATES PATENTS

| 1,039,637 | 9/1912 | Berti | 53/229 X |
| 3,633,517 | 1/1972 | Kao | 99/450.6 |
| 3,666,147 | 5/1972 | Shiraki et al. | 222/309 |
| 3,669,007 | 6/1972 | Pulici | 99/450.6 |
| 3,892,338 | 7/1975 | Trueman et al. | 222/254 |
| 3,930,440 | 1/1976 | Ohkawa | 198/156 X |

FOREIGN PATENTS OR APPLICATIONS 45-21620 7/1970 Japan .............................. 99/450.6

*Primary Examiner*—Philip R. Coe
*Attorney, Agent, or Firm*—Tab T. Thein

[57] ABSTRACT

Individually and combined, in a device for wrapping pre-cut dough sheets around a mixture of minced vegetables, meat and the like, to make rolled food: a device for supplying the mixture to the dough sheets; a device for doubling the filled dough sheets; and a device for folding over the filled and doubled dough sheets.

The invention also relates to other food processing devices, cooperating with the device for wrapping the dough sheet around the food mixture.

6 Claims, 9 Drawing Figures 4,014,254

DEVICE FOR WRAPPING SHEETS AROUND FOOD IN ROLLED FORM AND OTHER FOOD PROCESSING DEVICES

This invention relates to a device for wrapping dough sheets around food in rolled form, e.g. minced vegetables and meat, and especially offers a device which pushes out a given amount of the mixture on the sheet, bends the sheet, and adjusts its shape, including the mixture.

In the past, rolled food consisting of a mixture covered with a sheet was made by handcraft, and this has led to low productivity and a varying quality of the products. Today higher productivity and uniform quality are required. To meet this requirement, a device was needed which produces the products automatically and continuously. It is also most important and desirable to keep the food products in a sanitary condition, and to prevent the operators from contacting the products during the manufacturing process.

The first object of the invention is therefore to provide a device which produces large amounts of the products quickly, automatically and continuously.

The second object is to provide a device which produces uniform products with high quality.

The third object of the invention is to provide a device which produces the products under sanitary conditions, eliminating all manual operations in all stages of the process, from the raw materials to the finished products.

The essential feature of the invention is embodied in a device having a horizontal and a vertical cylinder with pistons by which a certain amount of the mixture is pushed out on a pre-cut dough sheet which is bent along with the back and both sides of the mixture by a bending arm and by bending vanes, respectively. This device produces rolled foods of uniform quality, sanitarily, and with high speed.

According to the most important features of the invention, it comprises three cooperating devices, namely one for supplying a mixture to dough sheets, one for doubling the sheets, and one for bending the filled sheets. Each of the devices has novel and useful features which will be set out as the description proceeds.

It should be added at this point that this invention is closely related to those of other applications, filed simultaneously herewith, namely one on a "Device for Wrapping Sheets around Food"; another on a "Device for Conveying Rolled Food"; yet another on a "Device for Processing Dough" (for forming and baking dough sheets); and finally one on a "Dough Processing Device" (preventing dough from sticking). These applications of the inventor were all filed on Mar. 12, 1974, respectively under Ser. Nos. 450,493, -90, -91 and -92, and became U.S. Pat. Nos. 3,930,439, -40 and -41 of Jan. 6, 1976, and 3,881,404 of May 6, 1975 /in the above indicated order/, respectively.

Other objects and many of the attendant advantages of the invention will be readily appreciated as the same becomes better understood by reference to the following detailed description, when considered with the accompanying drawings, wherein.

Figure 1:
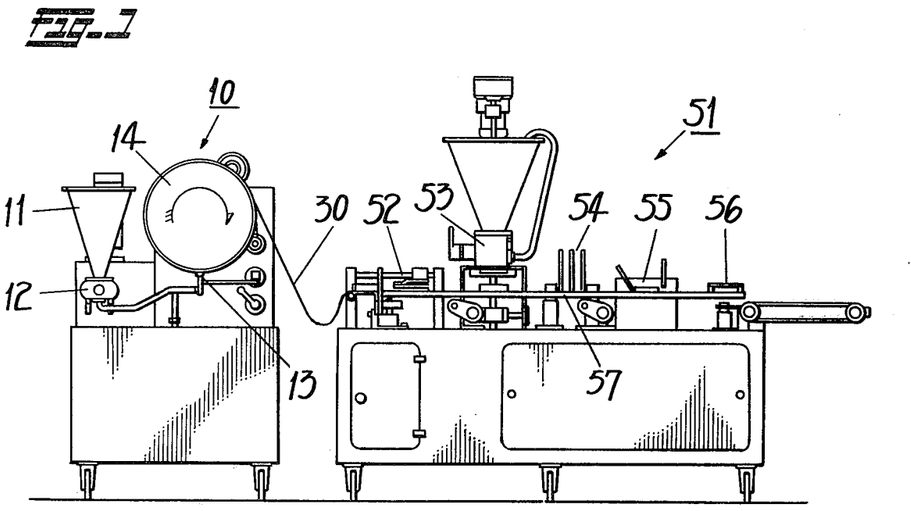
FIG. 1 is an elevation of a device for producing dough sheets and baking them, together with a device for pulling a dough sheet, incorporating further devices, in relation to the inventive device for wrapping sheets around food in rolled form.

A device 10 for producing dough sheets (patented as the earlier-mentioned "Device for Processing Dough"); as shown in FIG. 1 on the left hand side makes thin sheets from raw materials such as eggs and dough. The raw material is supplied by the operation of a gear pump 12 from a hopper 11 through a slit nozzle 13 on an iron-plate surface of a rotating drum 14 where a continuous belt of a thin dough sheet 30 is made.

A device 51 for pulling the continuous dough sheets cooperates with the above-mentioned device 10, which pulls the sheets 30, a device 52 for cutting up the dough sheets, namely the continuous thin sheets into the desired size, a device 53 for supplying a mixture of food or materials to the pre-cut dough sheets in a constant amount, a device 54 for doubling the dough sheets 30 along the back of the mixture supplied, a device 55 for bending the dough sheets along both sides of the mixture, a device 56 for wrapping the sheets around the food, namely into a cylindrical shape, and a device 57 for intermittently transferring the sheets 30 from each of the devices 52 to 56 to the next following device at predetermined intervals, as well as to the first device 52 and the filled food from the last device 56. The devices 56, 57 were respectively patented as the earlier-mentioned "Device for Wrapping Sheets around Food," and "Device for Conveying Rolled Food".

Figure 2:
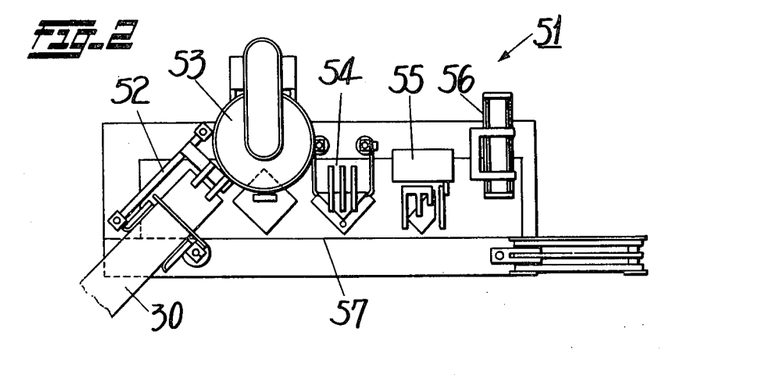
FIG. 2 is a plan view of a main portion of FIG. 1 with details of the inventive device and the pulling device with which it is shown associated.

In respect of the device for conveying rolled food, patented under U.S. Pat. No. 3,930,440 of Jan. 6, 1976, the schematic showing in FIGS. 1 and 2 of the present application should be sufficient to understand comb-shaped stationary cradles and interleaved, vertically and horizontally reciprocable cradles are used in that device, for substantially rectilinearly, intermittently transferring the pre-cut dough sheets from the cutting device to the mixture-supplying device 53, the filled sheets from the latter to the doubling device 54, and thence to the device 55 for folding over the sheets, and eventually the rolled food away from the latter, possibly to the wrapping device 56.

As it is fully described in the just mentioned own earlier patent, means are provided for operating the conveying and the other devices in a cyclically correlated manner.

The present invention relates to and is concerned with only the devices 53, 54 and 55, which will be described hereinafter in full detail. The mixture supplying device 53 embodies in part well-known techniques. For a better understanding of the description that follows, it should be noted that the numbering of the parts of the device 53 starts with number 301, that of the parts of the device 54 with 401, and in a similar manner the numbering in the device 55 with number 501.

Figure 3:
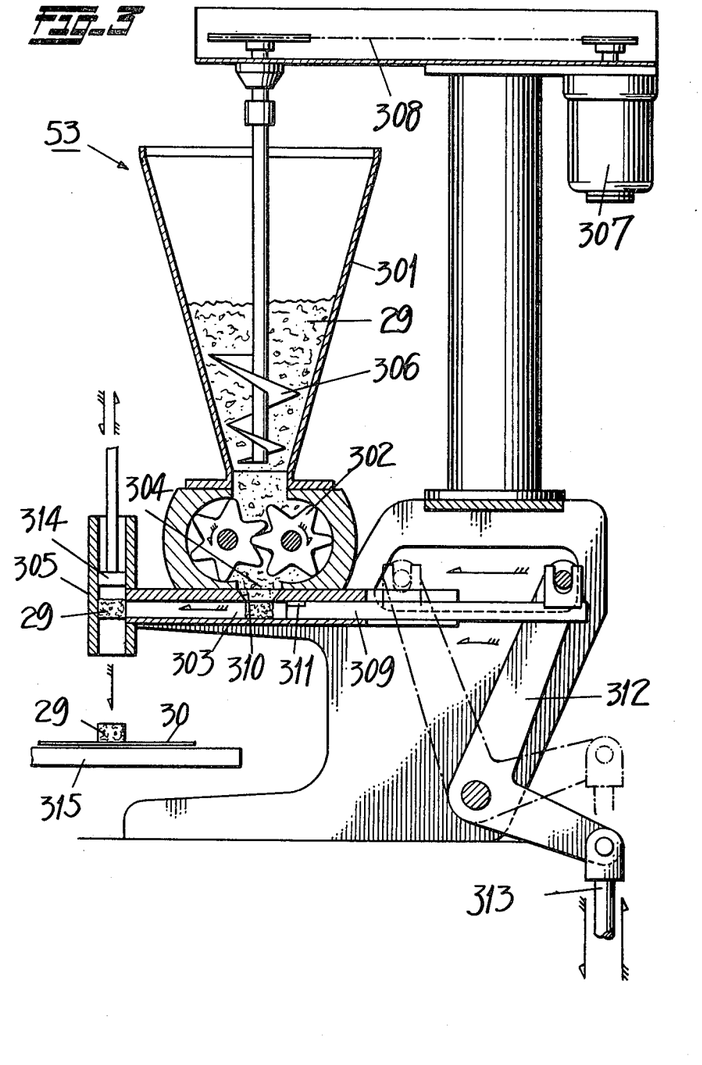
FIG. 3 is a vertical sectional view of a device for supplying mixture to the dough sheets.

As shown in FIG. 3, the device 53 comprises a hopper 301 and a gear pump 302. A horizontal cylinder 303 is provided under the pump, horizontally connected by an orifice 304, and another, vertical cylinder 305 is provided, connected to one end of the cylinder 303. An agitator screw 306 which pushes down a mixture 29 is provided in the hopper 301 and driven by a motor 307 through proper power transfer means such as belts, e.g. 308, and chains. The cross-section is rectangular and a piston 309 by which the mixture 29 is pushed out into the cylinder 305 is inserted into the cylinder 303. The bottom end of an orifice 310 which is at an acute angle and an edge 311 on the end of the piston 309 constitute a cutter by which fibrous material in the mixture 29 is cut. A bell crank 312 is connected with the other end of the piston 309, and reciprocated by a rod 313. The cross-section of the cylinder 305 is rectangular, corresponding to the cylinder 303, and a piston 314 is inserted in it to push out the mixture 29 in a downward direction.

A cradle 315 is provided under the cylinder 305, on which a wrapping material, namely the sheet 30, is conveyed and placed. The mixture 29 put into the hopper 301 is usually minced vegetables and meat, and it is pushed out to the gear pump 302 by the screw 308. The pump 302 is driven by a main rotating shaft of a cam mechanism (not illustrated). The gear pump 302 pushes out the mixture 29 from the orifice 304 to the cylinder 303. When the mixture is pushed out into the cylinder, the piston 309 is moved towards the left by the mechanism 312 operated by the rod 313 connected to another cam mechanism of the main rotating shaft. By this leftward movement of the piston 309, the mixture 29 is pushed out into the cylinder 305.

Then, a movement out of the other cam mechanism moves the piston 314 downwards, and the mixture out of the cylinder 305 is dropped on the sheet by this movement through the lower end of the cylinder 35, as shown by an arrow. The cylinder 305 is connected to the cylinder 303 in order to drop the mixture in a correct position onto the sheet, and the cross-section of the cylinders 303, 305 is made rectangular, as mentioned before, in order to obtain a square-shaped mixture 29 does not offset on the sheet 30 or roll away from the required position.

Figure 4:
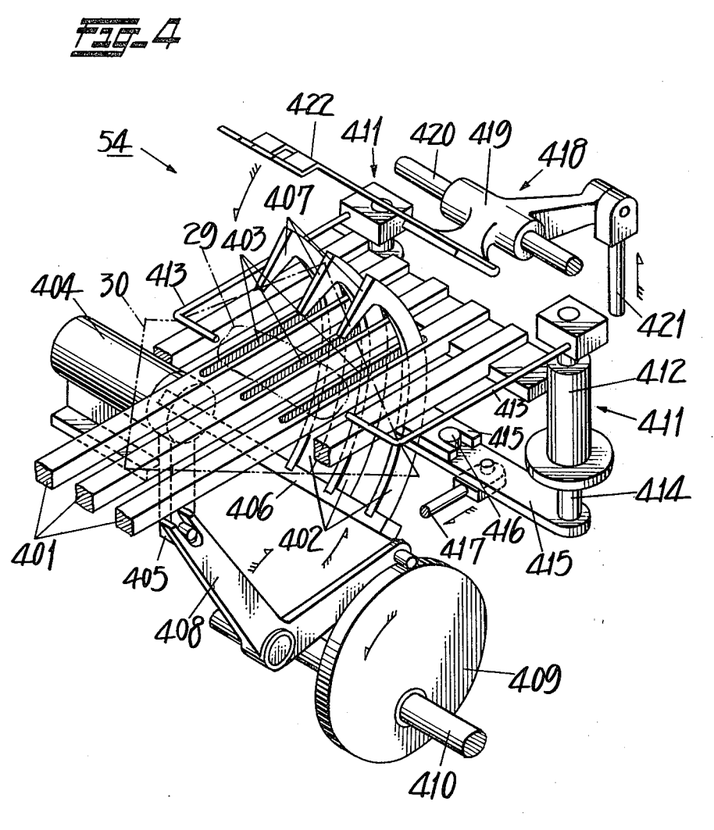
FIG. 4 is a perspective view of a device for doubling the sheets.

As shown in FIG. 4, the device 54 provides a fixed comb-shaped cradle 401, and has arcuate bending arms 402 allowed to pass in a substantially perpendicular direction through vertical holes or cut-outs 403 provided in the cradle 401. A bracket 404 is fixed perpendicular to the longitudinal direction of the cradle 401, and a rotating arm 405 is attached to the bracket 404. One end of an L-shaped member 406 is fixed at the rotational center of the arm 405, and the arms 402 are attached to the other end of the L-shaped member 406. The ends of the arms 402 are hooked nails 407, the pointed ends of which reach to the upper surfaces of the cradle 401 in accordance with the rotation of the arms 405. Each bending arm 402 is movable in a respective plane that is perpendicular to that of the cradle 401.

The outer ends of the arms 405 are connected to one end of a bell crank 408 that drives them, and the other end of the latter is operated by a cam plate 409 fixed on a main rotating shaft 410. A pressing mechanism 411 provides bearings 412 fixed close to the cradle 401, and pressing bars 413, fixed to a shaft 414, are inserted into the bearings 412. The bars 413 extend over and at least partly across the cradle 401. The shaft 414 rotates together with a double lever 415. One end of the latter is fixed to the shaft 414, and the other end to a pin 416, thus they are connected to each other. A rod 417, connected to the main rotating shaft of the other cam mechanism, is connected to either of the two levers 415, the reciprocation of the latter corresponding to the reciprocating movement of the rod 417.

A shape-adjusting mechanism 418 comprises a crank 419 inserted into a shaft 420 perpendicular to the longitudinal direction of the cradle 401, a rod 421 connected to one end of the crank 419 and a pivotable shaping member 422 having different levels of ends connected to the other end of the cradle. The rod 421 moves up and down, corresponding to the connected other cam mechanism of the main rotating shaft.

Figure 5:
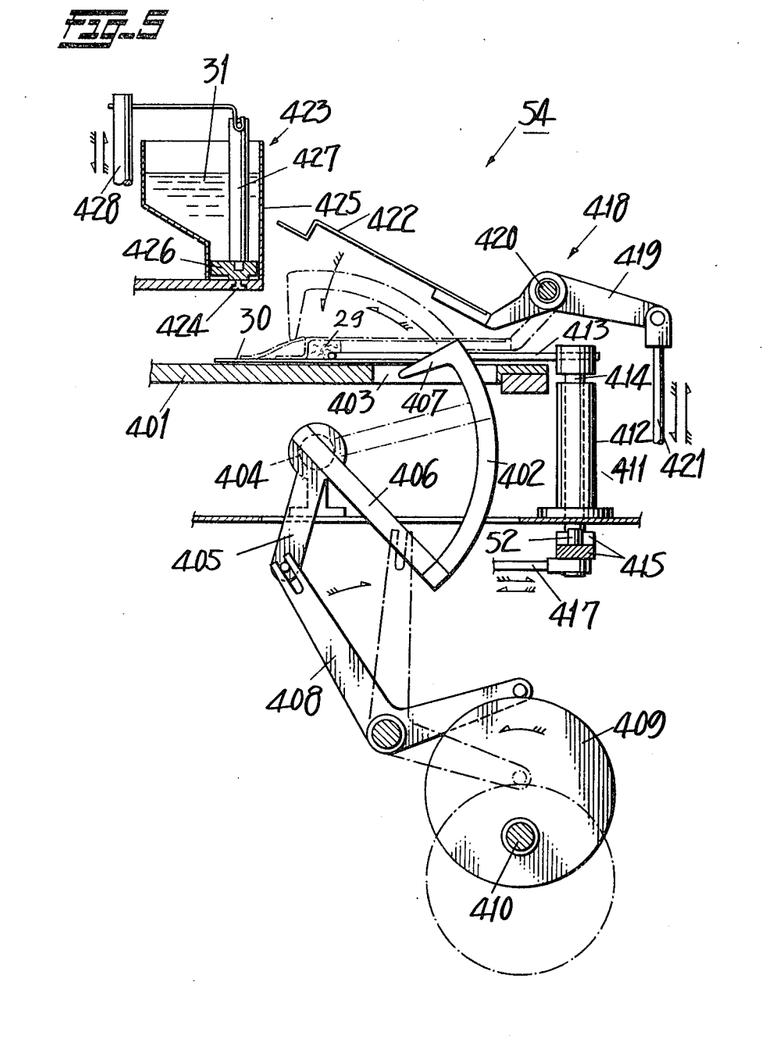
FIG. 5 is a front view of the device shown in FIG. 4.

A device for paste dropping is shown by numeral 423 in FIG. 5. A pin hole 424 is provided at the bottom of a tank 425 for holding a paste 31, and a piston 426 is located above the pin hole 424. A rod 427, the upper end of which projects from the tank 425, is fixed to the upper end of the piston 426, and a rod 428, which is imparted vertical reciprocation by still another cam mechanism (not shown), also of the main rotating shaft, is connected to the rod 427.

Referring now to FIGS. 4 and 5, illustrating the device 54, when one of the pressing bars 413 is located outside of the cradle 401, the sheet 30 carrying the mixture 29 is conveyed and put onto the cradle 401. Then, the rod 417 operates the lever 415 which moves the pressing bar 413 across the cradle 401, and the end of the bar 413 presses the sheet 30 along with the back of the mixture. Then, the bell crank 408 driven by the cam plate 409 drives the lever 405 and the member 406, one end of which is attached to the lever 405, moves the bending arms 402 upwards, as shown in FIG. 5 in dotted lines, while the nails 407 completely bend the sheet 30.

Further rotation of the plate 409 returns the arms 402 to the original location, and when the bar 413 goes away from the sheet 30, the crank 419, driven by the rod 421, moves the member 422 to the upper surface of the cradle 401 and the projecting end of the member 422 presses the sheet to the mixture. Then paste 31 in the tank 425 is dropped onto a given area of the sheet 30 by the upward movement of the piston 426 together with the rod 428. The paste 31 is dropped on the sheet so that the end of the sheet fastens together or sticks when the same is rolled in the subsequent stages of the process.

Figure 6:
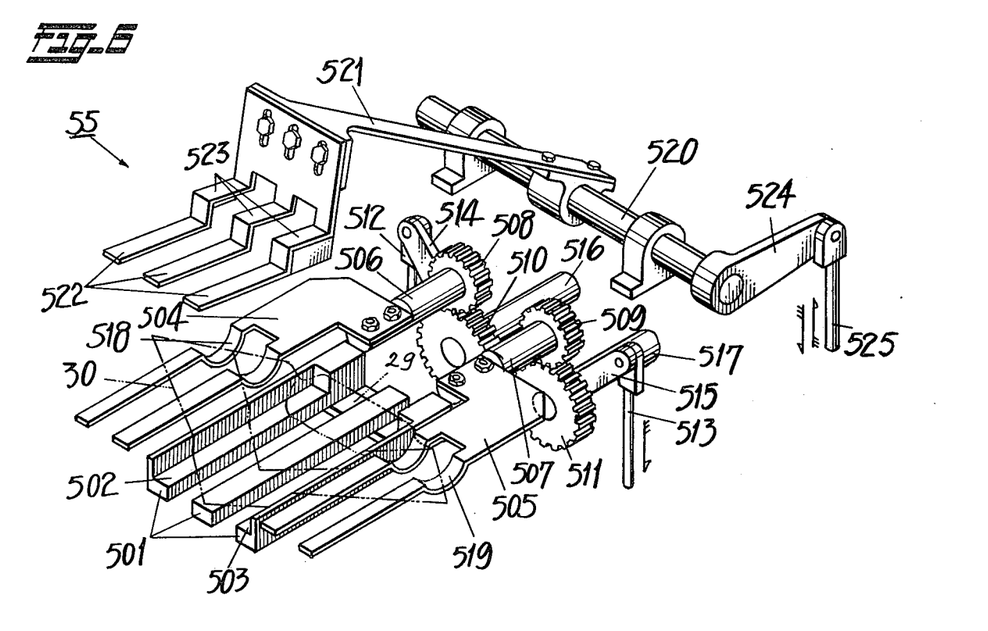
FIG. 6 is a perspective view of a device for bending the dough sheet on both sides.

Referring to FIG. 6, a comb-shaped cradle 501 is fixed to the device 55, and the sheet 30 doubled by the device 54 and containing the mixture 29 is conveyed and put on the cradle 501. It should be noted that the cradle 401 of the device 54 and the cradle 501 of the device 55 are located like a comb so that the sheets can be transferred from one device to the other without difficulties, e.g. by means of the device 57.

Bending grooves or concavities 502, 503 are provided in both side members of the cradle 501 that face each other, by which the shape of the cradle becomes like a shallow dish. Bending vanes 504, 505, having partially curved portions, are provided close to both sides of the cradle 501. These vanes are fixed to horizontal shafts 506, 507 having gears 508, 509 respectively engaged with rotating-angle adjusting gears 510, 511. The latter are driven by rods 512, 513 connected to the outer ends of levers 514, 515 fixed to shafts 516, 517.

The vertical reciprocal motion of the rods 512, 513 is imparted by a cam mechanism (not shown) of the main rotating shaft. When the rod 512 or 513 moves downwards, the vane 504 or 505 moves towards the cradle 501; on the contrary, when the rod 504 or 505 moves upwards, the vane 504 or 505 moves away from the cradle 501. A respective curved concave portion 518, 519 of the vanes 504, 505 adjusts the shape of the mixture 29 in the sheet 30 when placed on the cradle 501.

Furthermore, a shaft 520 is provided perpendicular to the longitudinal direction of the cradle 501, and one end of a supporting arm 521 is fixed to the shaft 520. A shaping member 522 is fixed to the other end of the arm 521 in a way that it is located above the cradle 501. The member 522 is of a comb-shaped material having projecting portions 523 at its base. These portions are provided for adjusting the shape of the mixture 29 in the sheet 30. The vertical reciprocal movement of the shaping member 522 is imparted by the operation of one end of a lever 524 to which a rod 525 is connected, and another end of which is fixed to the shaft 520.

Figure 7A:
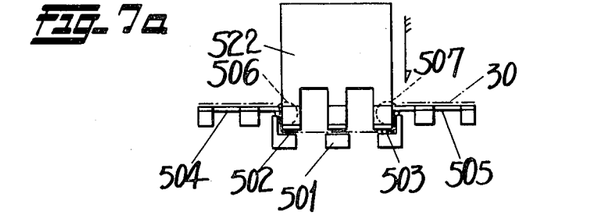
FIGS. 7a, 7b and 7c explain the operation of the device illustrated in FIG. 6.
Figure 7B:
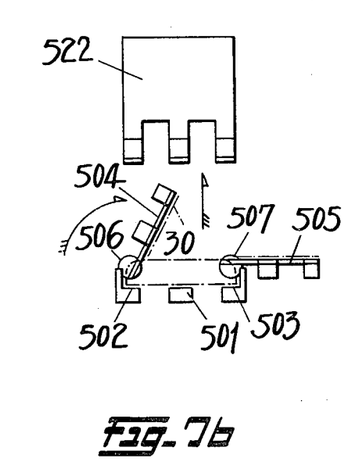
Figure 7C:
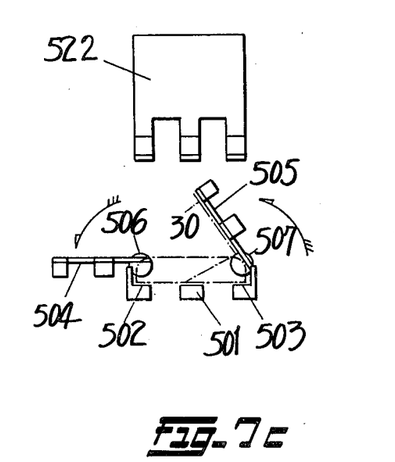

In accordance with FIGS. 7a, 7b and 7c, the sequence of actions of the vanes 504, 505 and the shaping member 522 are explained hereunder. When a doubled sheet 30 containing the mixture 29 is transferred and put on the cradle 501, the member 522 pivots downward to the upper surface of the cradle 501 by means of the action of the rod 525 as shown in FIG. 7a. At this time, the member 522 descends into the grooves 502, 503, thus the sheet 30 is bent along with both sides of the mixture 29.

Then the shaping member 522 is pivoted upwardly from the cradle 501, as shown in FIG. 7b, the vane 504 is moved downwardly by the action of the rod 512 to the upper surface of the cradle 501, and one side of the sheet 30 is bent by the vane 504.

Then the latter is moved upwardly from the cradle 501 to its original position, the other vane 505 being moved downwardly (see FIG. 7c) by the action of the rod 513 to the cradle 501, and thus the other end of the sheet is also bent.

When the vane 505 turns away from the cradle 501 towards its original position, the bent sheet 30 is sent to the device 56 for the next step, and another doubled sheet is transferred from the device 54 to the cradle 501, and the device 55 repeats the above-described steps.

The devices explained above are especially suitable for wrapping a thin dough sheet around a mixture of minced vegetables and meat, thus producing rolled foods. The mixture is pushed out from the horizontal cylinder 303 to the vertical cylinder 305, and then a given amount of the mixture is placed on a given area of the sheet 30, as shown in FIG. 3.

The device 54 shown in FIG. 4 and the device 55 shown in FIG. 6 bend automatically the sheets, and all the process steps are mechanized. Therefore, the products obtained by the inventive arrangement are quite sanitary.

It should be understood, of course, that the foregoing disclosure relates only to a preferred embodiment and to preferred features of the invention, and that it is intended to cover all changes and modifications of the examples described which do not constitute departures from the spirit and scope of the invention.

What I claim is:

1. A device for wrapping previously made pre-cut dough sheets around a mixture of minced vegetables, meat and the like, to make rolled food, comprising, in combination: a first device for supplying the mixture to the dough sheets; a second device for doubling the filled dough sheets; and a third device for folding over the filled and doubled dough sheets; wherein said second device includes a stationary cradle having substantially parallel teeth with at least one cut-out in said cradle; at least two bending arms in respective planes that are substantially perpendicular to that of said cradle, movable at least partly through said cut-out about an arc-shaped path; at least one lateral pressing bar extending over and at least partly across said cradle, for holding down the sheets to the upper surface of said cradle, after they have been folded; and a shaping member pivotable toward and away from said cradle, for securing the mixture to the doubled dough sheets while on said cradle.

2. The device as defined in claim 1, further comprising a mechanism for dropping a paste onto an end region of said cradle, including a tank and means for releasing a predetermined amount of the paste, for sticking together portions of the dough sheets on said cradle, having the mixture thereon.

3. A device for wrapping previously made pre-cut dough sheets around a mixture of minced vegetables, meat and the like, to make rolled food, comprising, in combination: a first device for supplying the mixture to the dough sheets; a second device for doubling the filled dough sheets; and a third device for folding over the filled and doubled dough sheets; wherein said third device includes a stationary comb-shaped cradle having a shallow, dish-shaped concavity therein for receiving the doubled dough sheets having the mixture thereon; a shaping member pivotable toward and away from said cradle, for adjusting the shape of the mixture; and a pair of vanes flanking said cradle and movable along semi-circular paths towards and away from said cradle, for folding over the doubled dough sheets.

4. A device for doubling previously made dough sheets filled with a mixture of vegetables, meat and the like, to make rolled food with the dough sheets being wrapped around the mixture, the device cooperating with a device for supplying the mixture, and with a device for folding over the filled and doubled dough sheets; the doubling device including a stationary cradle having substantially parallel teeth with at least one cut-out in said cradle; at least two bending arms in respective planes that are substantially perpendicular to that of said cradle, movable at least partly through said cut-out about an arc-shaped path; at least one lateral pressing bar extending over and at least partly across said cradle, for holding down the sheets to the upper surface of said cradle, after they have been folded; and a shaping member pivotable toward and away from said cradle, for securing the mixture to the doubled dough sheets while on said cradle.

5. The doubling device as defined in claim 4 further comprising a mechanism for dropping a paste onto an end region of said cradle, including a tank and means for releasing a predetermined amount of the paste, for sticking together portions of the dough sheets on said cradle, having the mixture thereon.

6. A device for folding over previously made and doubled dough sheets filled with a mixture of minced vegetables, meat and the like, to make rolled food with the dough sheets being wrapped around the mixture, the device cooperating with a device for supplying the mixture, and with a device for doubling the dough sheets filled with the mixture; the folding device including a stationary comb-shaped cradle having a shallow, dish-shaped concavity therein for receiving the doubled dough sheets having the mixture thereon; a shaping member pivotable toward and away from said cradle, for adjusting the shape of the mixture; and a pair of vanes flanking said cradle and movable along semi-circular paths toward and away from said cradle, for folding over the doubled dough sheets.

* * * * *